(12) United States Patent
Maeshima

(10) Patent No.: US 6,798,760 B2
(45) Date of Patent: Sep. 28, 2004

(54) RADIO COMMUNICATION SYSTEM, METHOD THEREOF, RADIO COMMUNICATION APPARATUS AND METHOD THEREOF

(75) Inventor: Yasunori Maeshima, Tokyo (JP)

(73) Assignee: Sony Corporation, Tokyo (JP)

(*) Notice: Subject to any disclaimer, the term of this patent is extended or adjusted under 35 U.S.C. 154(b) by 678 days.

(21) Appl. No.: 09/731,155

(22) Filed: Dec. 6, 2000

(65) Prior Publication Data
US 2001/0021655 A1 Sep. 13, 2001

(30) Foreign Application Priority Data
Dec. 7, 1999 (JP) .......................................... 11-348058

(51) Int. Cl.[7] .............................. H04J 3/00; H04J 3/16
(52) U.S. Cl. ...................... 370/336; 370/348; 370/437; 370/468; 455/435.1; 455/452.1
(58) Field of Search ................................. 370/328, 229, 370/336, 337, 345, 346, 347, 348, 349, 437, 310.2, 461, 462, 468; 455/422.1, 435.1, 435.2, 435.3, 450, 452.1

(56) References Cited
U.S. PATENT DOCUMENTS 5,818,823 A * 10/1998 Nakanishi .................. 370/322
6,026,082 A * 2/2000 Astrin ........................ 370/336
6,314,091 B1 * 11/2001 LaRowe et al. ............. 370/338
6,424,645 B1 * 7/2002 Kawabata et al. .......... 370/347

* cited by examiner

Primary Examiner—Ricky Ngo
Assistant Examiner—Lee Khuong
(74) Attorney, Agent, or Firm—Frommer Lawrence & Haug LLP; William S. Frommer; Darren A. Simon (57) ABSTRACT

A radio communication system where a connection between a controlled radio communication apparatus and a controlling radio communication apparatus is registered. A controlling radio communication apparatus sends vacant slot information indicative of a vacant time division multiplexing time slot to a controlled radio communication apparatus, the controlled radio communication apparatus sends a connection register request signal to the controlling radio communication apparatus using a vacant time division multiplexing time slot based on the vacant slot information, the controlling radio communication apparatus allocates the vacant time division multiplexing time slot to the controlled radio communication apparatus that sent the connection register request signal based on the received connection register request signal, thereby registering the connection of the controlled radio communication apparatus, and the controlled radio communication apparatus sends a control signal using the time division multiplexing time slot allocated by the first radio communication apparatus. With this structure, it is possible to automatically register a connection of a controlled radio communication apparatus.

24 Claims, 6 Drawing Sheets

| Station Info #1 | ID of Station #1 (hub 2) | SSP #0 |
|---|---|---|
| Station Info #2 | ID of Station #3 (leaf apparatus 32) | SSP #1 |
| Station Info #3 | Vacant | SSP #2 |
| Station Info #4 | Vacant | SSP #3 |

| Cycle Time | Network ID | Update Timer | Number of Slot Info |
|---|---|---|---|
| Frame End Pointer | Size of Fixed Length Frame | | CRC |
| Station Info #1 | Station Info #2 | Station Info #3 | Station Info #4 |
| Slot Info. #1 | Slot Info. #2 | | CRC |

Cycle Start Packet (CSP)

FIG. 3B

| Station Info #1 | ID of Station #1 (hub 2) | SSP #0 |
|---|---|---|
| Station Info #2 | ID of Station #3 (leaf apparatus 32) | SSP #1 |
| Station Info #3 | Vacant | SSP #2 |
| Station Info #4 | Vacant | SSP #3 |

FIG. 3C

| RRP | ID of Station # | CRC |
|---|---|---|

Register Request Packet (RRP)

FIG. 6

RADIO COMMUNICATION SYSTEM, METHOD THEREOF, RADIO COMMUNICATION APPARATUS AND METHOD THEREOF

BACKGROUND OF THE INVENTION

1. Field of the Invention

The present invention relates to a radio communication system, and a method and radio communication apparatus thereof where a connection between a controlled radio communication apparatus and a controlling radio communication apparatus is registered.

2. Description of the Related Art

In a radio communication system for carrying out radio communications using controlled radio communication apparatuses, a controlled radio communication apparatus must register a connection with a controlling radio communication apparatus, whereby the controlling radio communication apparatus conducts polling for controlled radio communication apparatuses with registered connections and a sending operation of a controlled radio communication apparatus is permitted by the polling. Since a sending operation from a controlled radio communication apparatus is permitted by polling and the polling is conducted only with respect to registered connections, a radio communication apparatus whose connection is not registered cannot conduct a sending operation. In addition, if the controlling radio communication apparatus does not receive a control signal from a controlled radio communication apparatus whose connection is registered, the registered connection is invalidated. Thus, if a connection between a controlling radio communication apparatus and a controlled radio communication apparatus is interrupted for even a moment due to an unstable communication environment, a registered connection of the controlled radio communication apparatus may be invalidated. Since connection registration cannot be carried out automatically, it would be necessary to register the connection again, and radio communication becomes unstable.

OBJECTS OF THE INVENTION

The present invention was made in consideration of the above problem and has as its object the provision of a radio communication system and method capable of automatically registering a controlled radio communication apparatus.

It is another object of the invention to provide a radio communication system and method capable of carrying out stable radio communication.

Other objects and advantages of the invention will in part be obvious and will in part be apparent from the specification and the drawings.

SUMMARY OF THE INVENTION

To solve the above-described problems and to achieve the objects of the invention, in a radio communication system of the present invention, a first radio communication apparatus controls a single or a plurality of second radio communication apparatuses, the first radio communication apparatus sends vacant slot information indicative of vacant time division multiplexing time slots to a second radio communication apparatus, the second radio communication apparatus sends a connection register request signal using a vacant time division multiplexing time slot based on the vacant slot information, the first radio communication apparatus registers the connection of the second radio communication apparatus by allocating the vacant time division multiplexing time slot to the second radio communication apparatus that sends the connection register request signal, and the second radio communication apparatus sends a control signal using the time division multiplexing time slot allocated by the first radio communication apparatus.

In accordance with an embodiment of the present invention, the first radio communication apparatus sends vacant slot information indicative of vacant time division multiplexing time slots to the second radio communication apparatus. A second radio communication apparatus sends a connection register request signal to the first radio communication apparatus using a vacant time division multiplexing time slot based on the vacant slot information. Then, the first radio communication apparatus allocates the vacant time division multiplexing time slot to the second radio communication apparatus that sends the connection register request signal based on the connection register request signal received from the second radio communication apparatus using the vacant time division multiplexing time slot. Next, the second radio communication apparatus sends a control signal using the time division multiplexing time slot allocated by the first radio communication apparatus.

According to an embodiment of the present invention, a second radio communication apparatus whose connection is not registered specifies a vacant time division multiplexing time slot based on the vacant slot information received from a first radio communication apparatus, and sends a connection register request signal to the first radio communication apparatus using the vacant time division multiplexing time slot. As a result, the second radio communication apparatus can automatically register the connection without receiving polling from the first radio communication apparatus.

According to an embodiment of the present invention, the first and second radio communication apparatuses confirm communication quality between them based on the control signal received from one another on the time division multiplexing time slot.

According to an embodiment, the radio communication is carried out using a frame as a unit, and the frame includes a first period during which the vacant slot information is sent and a second period which is allocated to the plurality of time division multiplexing time slots.

The frame may further include a third period during which a data signal is sent and received, where a second radio communication apparatus whose connection is registered may send and receive a data signal using the third period.

According to an embodiment, a second radio communication apparatus asynchronously sends or receives a data signal using the third period, and the first radio communication apparatus controls the communication of the data signal of the second radio communication apparatus by way of polling.

In accordance with an embodiment of the invention, a first radio communication apparatus judges whether a connection registration of a second radio communication apparatus should be allowed or rejected based on the connection register request signal received from the second radio communication apparatus, and a result of the judgment is sent to the second radio communication apparatus using the third period.

According to an embodiment of the invention, when a first radio communication apparatus does not receive a control signal that should have been received using the time division multiplexing time slot from a second radio communication apparatus for a predetermined period of time, the first radio communication apparatus cuts the communication of the second radio communication apparatus, but holds, during the predetermined period of time, the connection register of the second radio communication apparatus even though the first radio communication apparatus does not receive the control signal from the second radio communication apparatus. Thus, even if the first radio communication apparatus does not receive the control signal from the second radio communication apparatus due to an unstable radio communication environment, the first radio communication apparatus can hold the connection register of the second radio communication apparatus. As a result, it is possible to effectively prevent the connection of the second radio communication apparatus from being cut frequently, and prevent connection registration from being frequently repeated, and stable radio communication can be carried out.

The invention accordingly comprises the several steps and the relation of one or more of such steps with respect to each of the others, and the apparatus embodying features of construction, combination(s) of elements and arrangement of parts that are adapted to effect such steps, all as exemplified in the following detailed disclosure, and the scope of the invention will be indicated in the claims.

DETAILED DESCRIPTION OF THE PREFERRED EMBODIMENT

Figure 1:
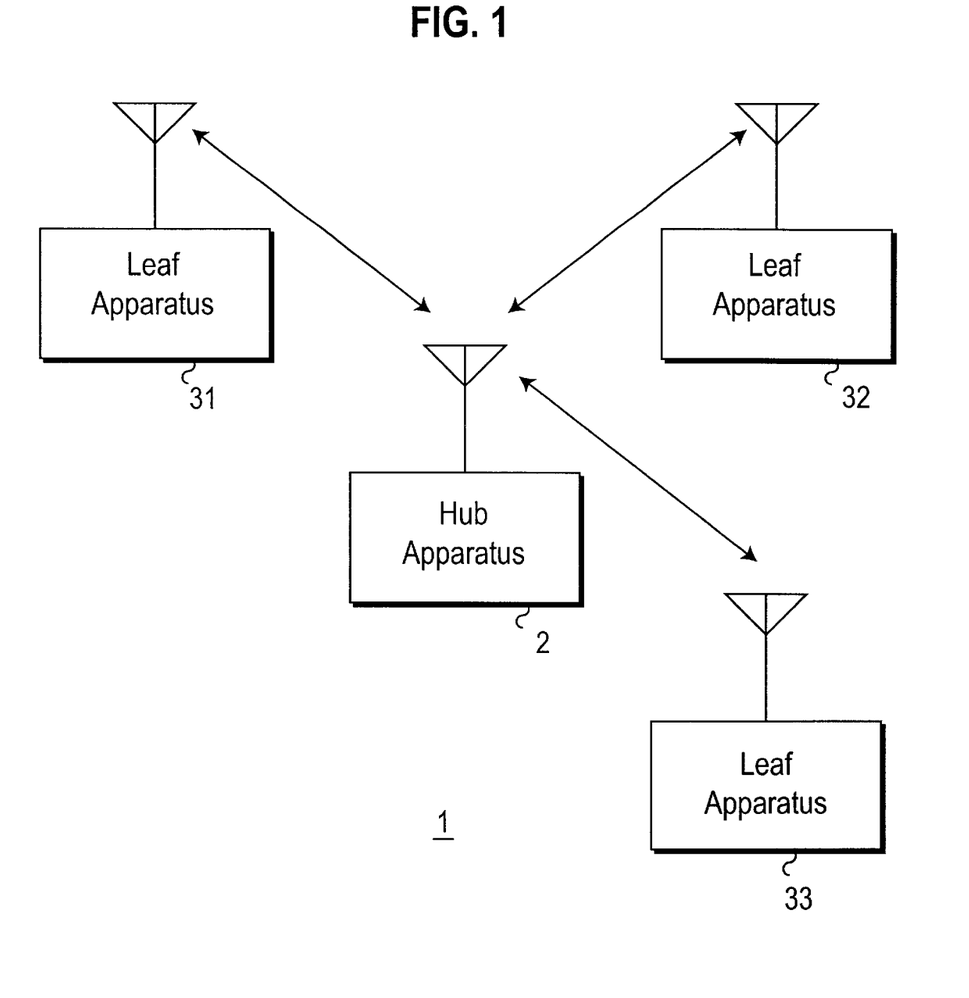
FIG. 1 is a block diagram of a radio communication system in accordance with an embodiment of the present invention.

FIG. 1 illustrates a radio communication system 1 according to an embodiment of the present invention.

As shown in FIG. 1, radio communication system 1 includes a hub apparatus (hereinafter "hub") 2 and leaf apparatuses 31, 32, and 33. It is noted that although three leaf apparatuses 31, 32, and 33 are provided in the illustrated embodiment, radio communication system 1 is not limited to any number of leaf apparatuses and/or hubs.

In FIG. 1, arrows indicate control signals (radio frequency or "RF") sent and received between hub 2 and leaf apparatuses 31, 32, and 33. Data signals, other than the control signals, may be sent and received directly between leaf apparatuses 31, 32, and 33 without being relayed at hub 2.

Figure 2:
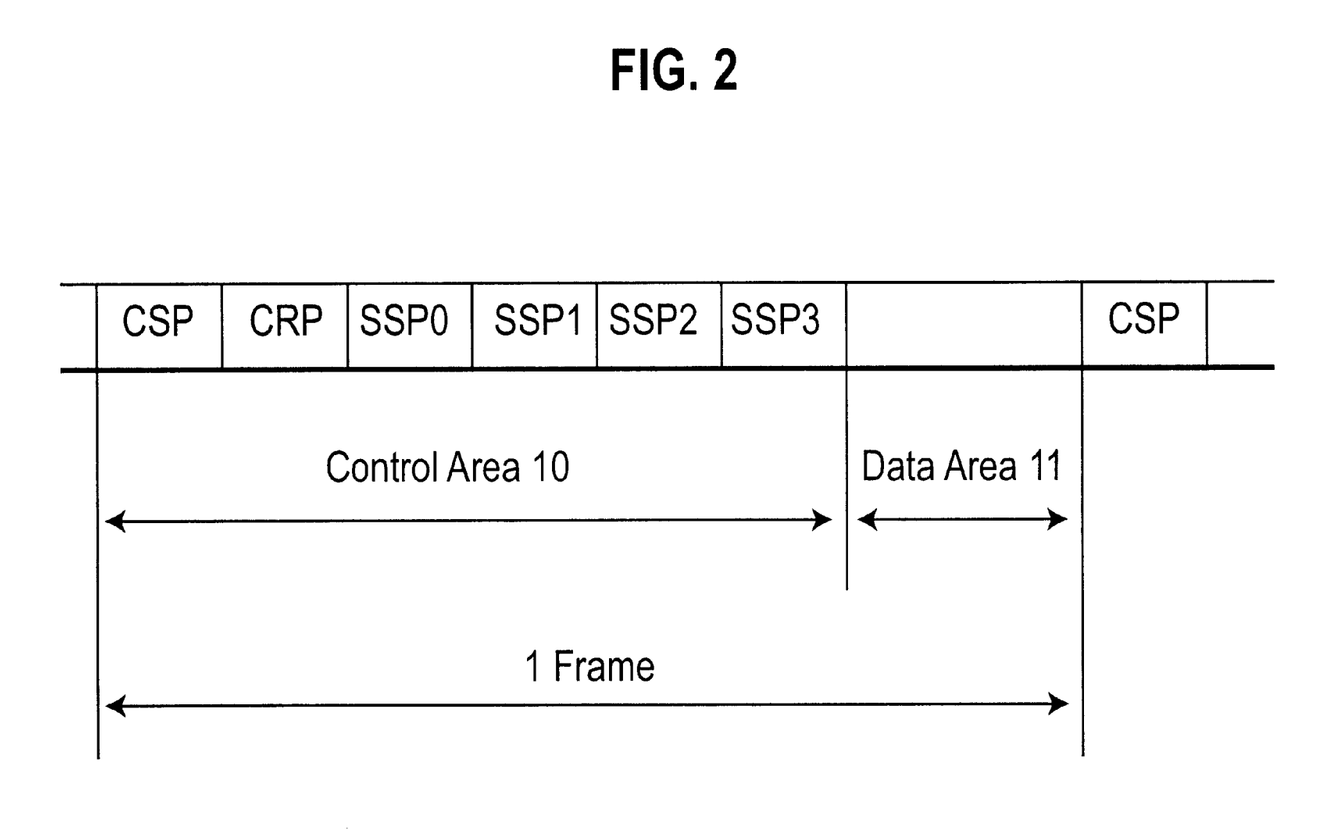
FIG. 2 is a diagram showing a frame format of signals sent and received between a hub apparatus and leaf apparatuses shown in FIG. 1.

FIG. 2 shows a frame format of a signal sent and received between hub 2 and leaf apparatuses 31, 32, and 33. In accordance with an embodiment of the invention, one frame may have a duration of approximately 4 milliseconds ("ms"). It is noted that the actual relative proportions of the components of an actual frame of a signal between hub 2 and leaf apparatuses 31, 32, and 33 may be different from that shown by the frame format in FIG. 2.

As shown in FIG. 2, each frame includes a control area 10 and a data area 11. Control area 10 includes a cycle start packet CSP, a cycle register packet CRP, station sync packets SSP0, SSP1, SSP2, and SSP3.

Cycle start packet CSP indicates connection register state which is generated and sent by hub 2 and which includes vacant slot information and the like.

Station sync packets SSP0, SSP1, SSP2, and SSP3 include identifiers for hub 2 and leaf apparatuses 31, 32, and 33 (unique ID), identifiers inherent in a radio network (serial number of hub 2) and the like. Station sync packets SSP0, SSP1, SSP2, and SSP3 may be sent and received using the time division multiplexing time slot allocated to each apparatus.

Station sync packets SSP0, SSP1, SSP2, and SSP3 may be sent by hub 2 and leaf apparatuses 31, 32, and 33 whose connections are registered, thereby allowing the other apparatuses know their respective connection states by receiving the packets.

In accordance with an embodiment, station sync packet SSP0 is sent by hub 2, station sync packet SSP1 is sent by leaf apparatus 31, station sync packet SSP2 is sent by leaf apparatus 32, and station sync packet SSP3 is sent by leaf apparatus 33.

In data area 11, a data signal of actual data other than the control signal may be sent and received.

More specifically, in data area 11, leaf apparatuses 31, 32, and 33 may send and receive an asynchronous data signal and an isochronous data signal. That is, data area 11 may include a period for sending and receiving data signal in an asynchronous manner and a period for sending data by time division multiplexing time slots.

Leaf apparatuses 31, 32, and 33 may send and receive the asynchronous data signals based on the polling control of hub 2 and carrier sense multiple access ("CSMA") of leaf apparatuses 31,32, and 33.

Hub 2 may periodically send a cycle start packet CSP including vacant slot information indicative of vacant time division multiplexing time slots.

Figure 3A:
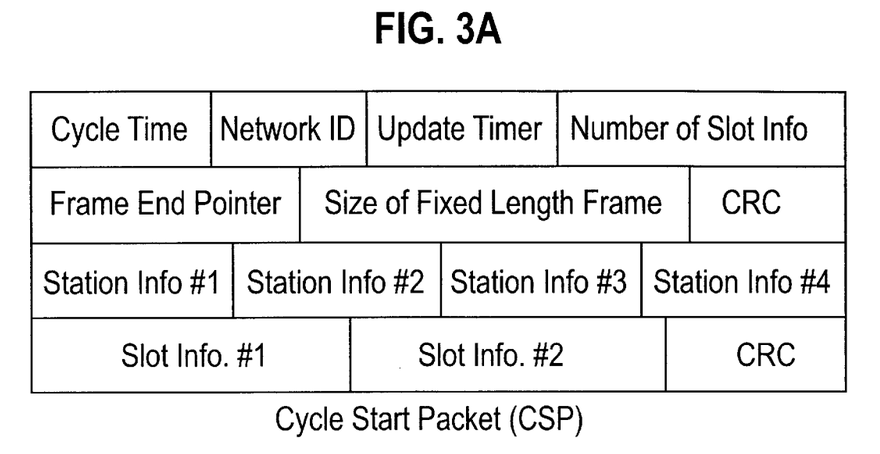
FIG. 3A illustrates a structure of a cycle start packet CSP in accordance with an embodiment of the invention.
Figure 3B:
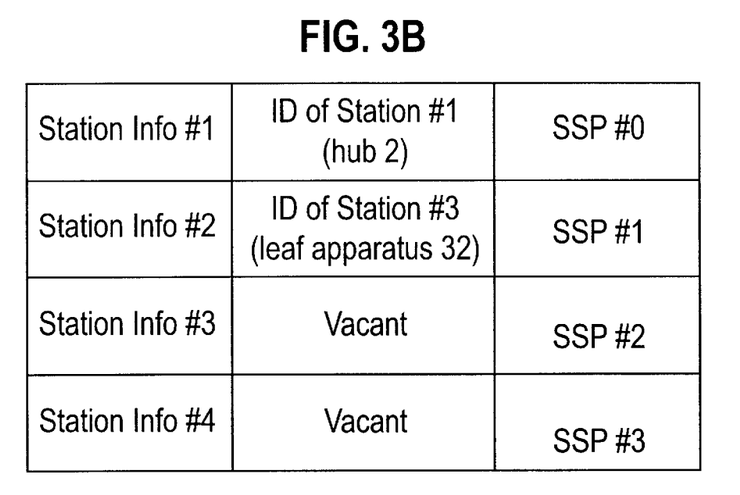
FIG. 3B shows an example of station information in a cycle start packet CSP in accordance with an embodiment of the invention.
Figure 3C:
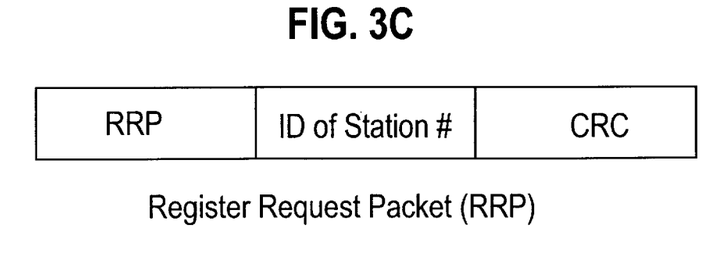
FIG. 3C illustrates a structure of a register request packet RRP according to an embodiment of the invention.

FIG. 3A illustrates a structure of a cycle start packet CSP; FIG. 3B illustrates an example of station information in such a cycle start packet CSP; and FIG. 3C illustrates a register request packet RRP in accordance with an embodiment of the invention.

As shown in FIG. 3A, a cycle start packet CSP includes a cycle time for indicating the start time of a frame; a network ID for identification purposes; an update timer for timing the frame; number of slot information, where two slots may include one each for isochronous and asynchronous data, respectively; a frame end pointer for indicating an end of data area 11, a size of fixed length frame; cycle redundancy check ("CRC") for error detection; station information 1–4, including vacancy information; slot information 1 and 2, which may include start points for isochronous and asynchronous data, respectively; and a CRC. The station information 1–4 may include inherent identification of hub 2 and/or leaf apparatus(es) 31, 32, and/or 33 assigned to the respective station sync packets SSP0, SSP1, SSP2, and SSP3, as shown in FIG. 3B.

FIG. 3B illustrates an example of station information 1–4 where SSP0 and SSP1 are assigned to hub 2 and leaf apparatus 32, respectively, and SSP2 and SSP3 are vacant. It is noted that ID of station #1 (for hub 2) and ID of station #3 (for leaf apparatus 32) may be any kind of identification, including inherent hardware identification, of the respective apparatuses. In view of the foregoing, hub 2 may register a connection of leaf apparatus 31, 32, or 33 by allocating a vacant time division multiplexing time slot (for example, SSP2 or SSP3 in FIG. 3B), on which hub 2 receives a connection register request signal sent from that leaf apparatus 31, 32, or 33, thereto. FIG. 3C illustrates a structure of a register request packet RRP that may be sent by leaf apparatus 31, 32, or 33 to hub 2 for requesting a registration of a connection thereto. Thus, as an example, leaf apparatus 31 or 33 may send a register request packet RRP such as the one shown in FIG. 3C with its inherent hardware identification (ID of Station #) at either of vacant SSP2 and SSP3 (as indicated in FIG. 3B) to hub 2 for requesting a registration of a connection.

If hub 2 receives a connection register request packet RRP and registers a connection, hub 2 sends a register acknowledge packet RAP to the corresponding leaf apparatus 31, 32, or 33 by using data area 11 in FIG. 2, and if hub 2 rejects the connection register request, hub 2 sends a register non-acknowledge packet RNP to the corresponding leaf apparatus 31, 32, or 33.

Hub 2 sends station sync packet SSP0 using the time division multiplexing time slot allocated to hub 2.

If hub 2 does not receive one of station sync packets SSP0, SSP1, SSP2, and SSP3 from a corresponding one of leaf apparatuses 31, 32, and 33 (whose connection is registered to the corresponding station sync packet SSP0, SSP1, SSP2, or SSP3), e.g., SSP1 from leaf apparatus 32 as indicated in FIG. 3B, for a predetermined period of time, hub 2 cuts the connection of the corresponding leaf apparatus 31, 32, or 33 (invalidate the connection register). Within said predetermined period of time, even if hub 2 does not receive the corresponding station sync packet SSP0, SSP1, SSP2, or SSP3 from the leaf apparatus 31, 32, or 33, the connection register of the leaf apparatus 31, 32, or 33 is put on hold.

If the connection of one of leaf apparatuses 31, 32, and 33 is not registered, the corresponding leaf apparatus 31, 32, or 33 specifies a vacant time division multiplexing time slot based on the vacant slot information included in a cycle start packet CSP received from hub 2, and sends a connection register request packet RRP to hub 2 using the time division multiplexing time slot.

Once their connections are registered, each of leaf apparatuses 31, 32, and 33 sends station sync packets SSP1 to SSP3 using the time division multiplexing time slot allocated by hub 2.

Hub 2 and leaf apparatuses 31, 32, and 33 confirm the communication quality between themselves and another apparatus based on station sync packets SSP1 to SSP3 sent from the other apparatus. Here, a state of reception, i.e., received power, is included in the communication quality. Hub 2 and leaf apparatuses 31, 32, and 33 each write, as control information, communication stations that it is capable of receiving on its assigned station sync packet SSP0, SSP1, SSP2 or SSP3 based on the station sync packets SSP0 to SSP3 sent by the other apparatuses. Thus, each apparatus 2, 31, 32, and 33 is able to know in what communication state each of the other apparatuses (communication stations), which constitute a radio network, is by receiving the station sync packets SSP0 to SSP3 (such communication state includes information as to which communication station it is possible to communicate with).

A procedure for registering the connections of leaf apparatuses 31, 32, and 33 by hub 2 will now be explained.

Figure 4:
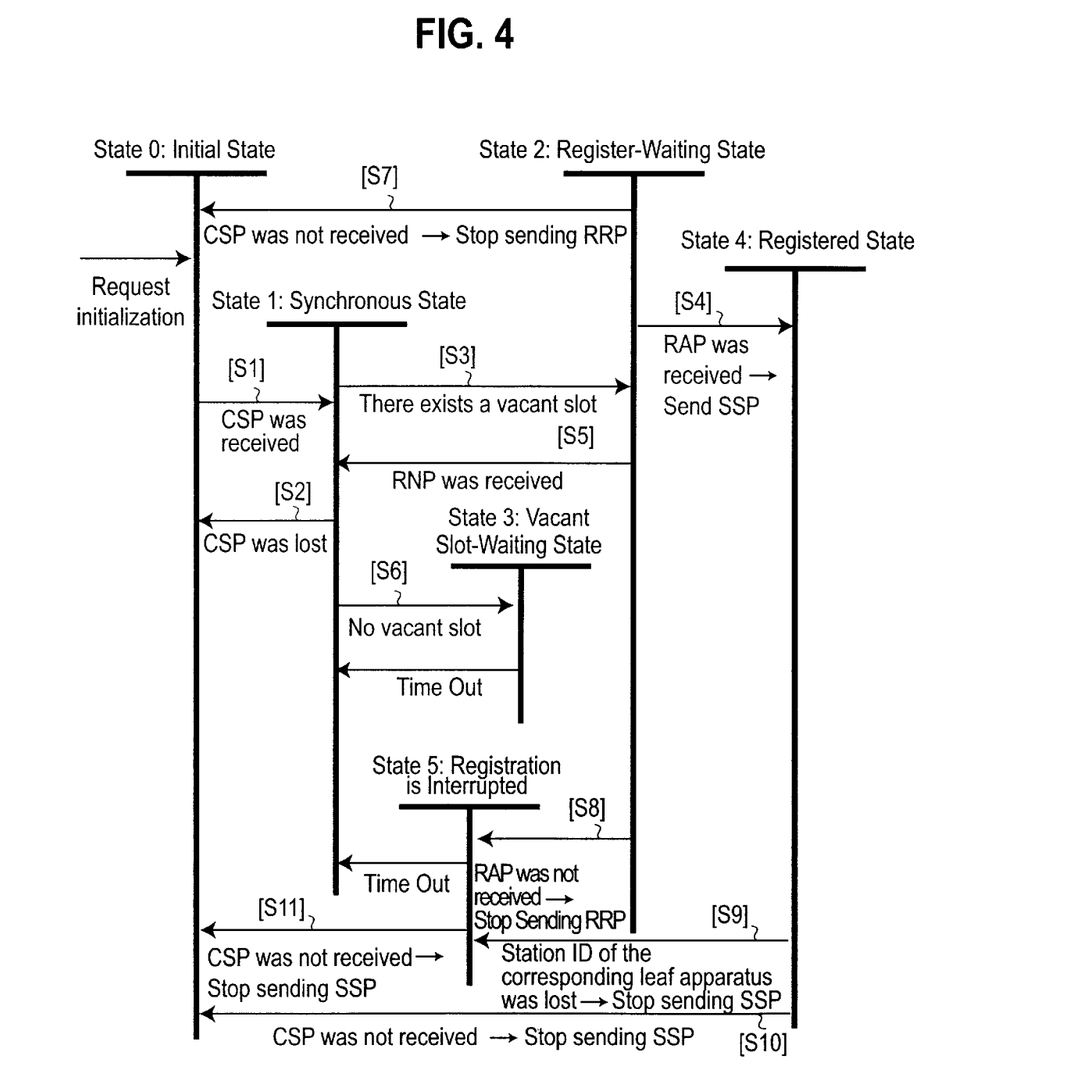
FIG. 4 is a diagram illustrating an internal state at the time of connection registration of the leaf apparatuses of FIG. 1 and a procedure of the registration according to an embodiment of the invention.

FIG. 4 shows an internal state at the time of connection registration of leaf apparatus 31 and a procedure of the registration. It is noted that an internal state and a procedure of registration for each of leaf apparatuses 32 and 33 may be the same as those for leaf apparatus 31. Thus, the following description regarding leaf apparatus 31 may also be applied to leaf apparatuses 32 and 33, respectively.

As shown in FIG. 4, leaf apparatus 31 includes a state 0 (initial state), a state 1 (synchronized state), a state 2 (register-waiting state), a state 3 (vacant slot-waiting state), a state 4 (registered state), and a state 5 (register interrupted state).

Leaf apparatus 31 is initially in state 0. In state 0, leaf apparatus 31 is not connected to hub 2 and cannot communicate with other leaf apparatuses 32 and 33. In state 0, leaf apparatus 31 attempts to catch hub 2 in a physical layer while changing the channel or receiving gain of a receiving antenna to seek hub 2.

Step S1: If leaf apparatus 31 detects a cycle start packet CSP sent by hub 2, i.e., if leaf apparatus 31 establishes synchronization with hub 2, it changes from state 0 to state 1.

Step S2: After leaf apparatus 31 establishes synchronization with hub 2, if leaf apparatus 31 becomes out of synchronization with hub 2 for any reason, e.g., if leaf apparatus 31 does not receive a cycle start packet CSP from hub 2 within a predetermined period of time, it is returned to state 0.

Step S3: Leaf apparatus 31 refers to the vacant slot information data included in the cycle start packet CSP received from hub 2 in step S1, and judges whether there exists time division multiplexing time slots which are not allocated to the other leaf apparatuses 32 and 33. If leaf apparatus 31 judges that there exists time division multiplexing time slots which are not allocated to the other leaf apparatuses 32 and 33, one of the time division multiplexing time slots is selected in a random fashion, and leaf apparatus 31 sends a register request packet RRP to hub 2 using the selected time division multiplexing time slot. Then, leaf apparatus 31 is changed from state 1 to state 2. In accordance with an embodiment of the invention, one of the time division multiplexing time slots may be allocated to leaf apparatus 31, where leaf apparatus 31 automatically selects said time slot, sends a register request packet RRP to hub 2 using said selected time slot, and changes from state 1 to state 2.

FIG. 3C illustrates a register request packet RRP in accordance with an embodiment of the invention. As shown in FIG. 3C, register request packet RRP includes an identifier (unique ID) 510 of leaf apparatus 31, which sent the register request packet RRP, an identifier inherent in a radio network (serial number of hub 2) 520, and the like.

Referring back to FIG. 4, leaf apparatus 31 waits in state 2 until leaf apparatus 31 receives a register acknowledge packet RAP from hub 2, i.e., until the registration procedure is completed in hub 2.

Step S4: If leaf apparatus 31 receives a register acknowledge packet RAP from hub 2, it is changed to state 4, and from this point in time, leaf apparatus 31 starts sending station sync packet SSP1 instead of register request packet RRP. The station sync packet SSP1 may be received by hub 2 and leaf apparatuses 32 and 33 in radio communication system 1.

Step S5: If leaf apparatus 31 receives a register rejection packet RNP, it is changed to state 1, and the procedure in step S3 is carried out again. For example, leaf apparatus 31 may receive the register rejection packet RNP if leaf apparatus 31 competes with another leaf apparatus 32 or 33 for the register request and lost.

Step S6: Leaf apparatus 31 refers to vacant slot information included in a cycle start packet CSP received from hub 2 in step S1, and if leaf apparatus 31 judges that there exists no time division multiplexing time slot which is not allocated to the other leaf apparatuses 32 and 33, it is changed to state 3, and back to state 1 after a predetermined time has elapsed.

Step S7: If leaf apparatus 31 does not receive a cycle start packet CSP from hub 2 continuously for a predetermined period of time, such as 1 second, it is changed to state 0, and stops sending the register request packet RRP.

Step S8: If leaf apparatus 31 does not receive a register acknowledge packet RAP from hub 2 for a predetermined period of time, such as 5 seconds, it is changed to state 5 and stops sending the register request packet RRP. Then, leaf apparatus 31 is changed to state 1 after a predetermined time, such as 5 seconds, has elapsed.

According to an embodiment, the predetermined period of time (5 seconds) in step S8 is set sufficiently longer than the predetermined period of time (1 second) in step S7.

Step S9: If leaf apparatus 31 judges from the vacant slot information included in a cycle start packet CSP received from hub 2 that leaf apparatus 31 itself has not yet been allocated, it is changed from state 4 to state 5 and stops sending the station sync packet SSP1.

Step S10: If leaf apparatus 31 does not receive a cycle start packet CSP from hub 2 after it has been in state 4 for a given period of time, such as 1 second, continuously, it is changed to state 0, whereupon the synchronous catching operation of step S1 is again repeated, and its sending operations of the station sync packet SSP are stopped.

Step S11: If leaf apparatus 31 does not receive a cycle start packet CSP from hub 2 after it has been in state 5 for a given period of time, such as 1 second, continuously, it is changed to state 0, whereupon the synchronous catching operation of step S1 is again repeated, and its sending operations of the station sync packet SSP are stopped.

Figure 5:
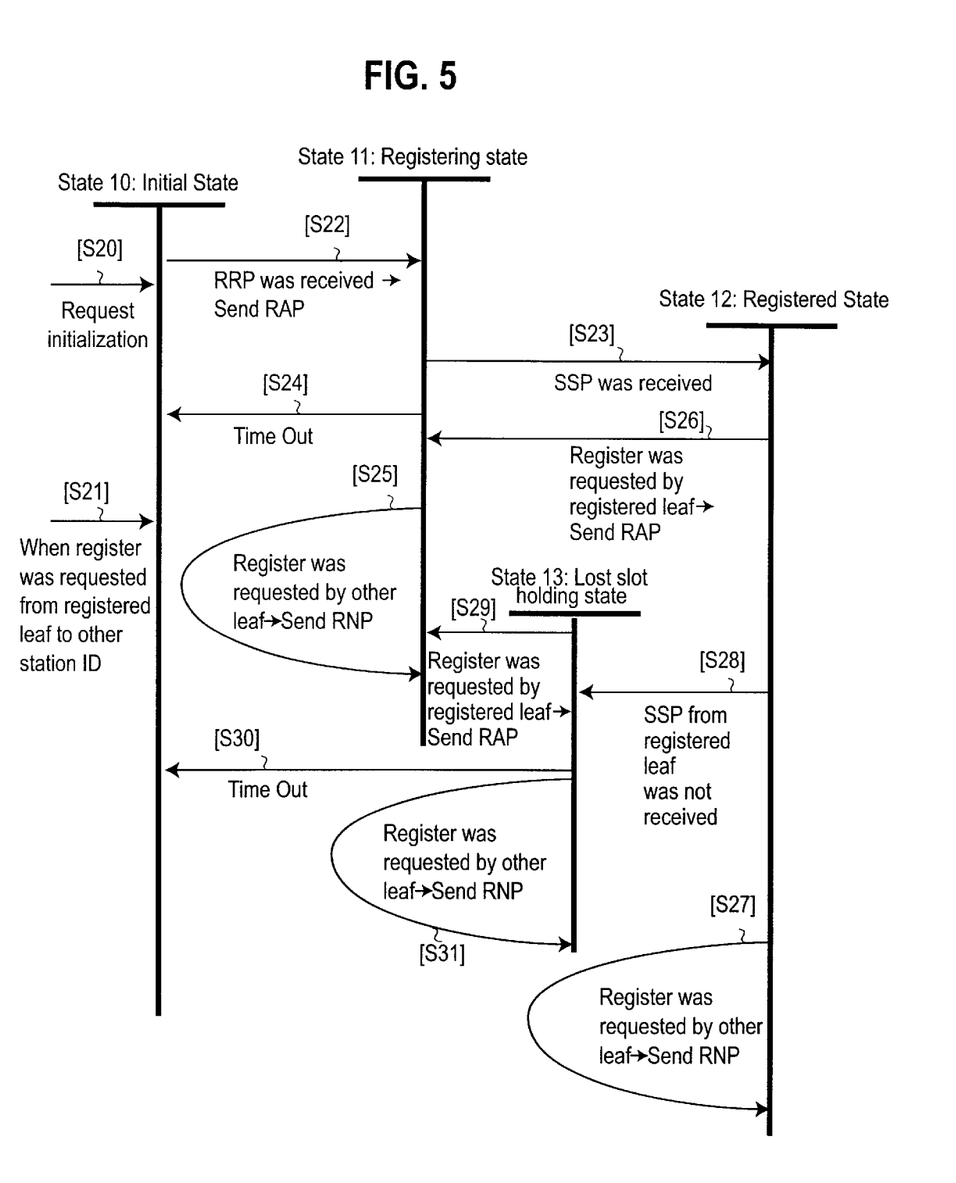
FIG. 5 is a diagram illustrating an internal state at the time of connection registration of the hub apparatus of FIG. 1 and a procedure of the registration according to an embodiment of the invention.

FIG. 5 shows an internal state at the time of connection registration of hub 2 and a procedure of the registration.

As shown in FIG. 5, hub 2 includes a state 10 (initial state), a state 11 (registering state), a state 12 (registered state), and a state 13 (lost slot-holding state). These states are determined for every time division multiplexing time slot (station ID) that is allocated by hub 2.

Step 20: Hub 2 is brought into state 10, i.e., an initial state, by an initialization request.

In state 10, hub 2 waits to receive connection register requests on any unused time division multiplexing time slots.

Step S21: If hub 2, whatever state it may be in, receives a register request packet RRP from a leaf apparatus 31, 32, or 33 designating a time division multiplexing time slot other than a time division multiplexing time slot allocated to the corresponding leaf apparatus 31, 32, or 33, hub 2 cancels the registered connection on the time division multiplexing time slot previously registered to the corresponding leaf apparatus 31, 32, or 33, and hub 2 is brought into state 10. Thus, hub 2 judges whether or not the leaf apparatus 31, 32, or 33 that sends the register request packet RRP is registered by comparing a unique ID included in the register request packet RRP with a list of registered unique IDs.

Step S22: If hub 2 receives a register request packet RRP designating a corresponding time division multiplexing time slot while it is in state 0, it is changed to state 11, and sends a register acknowledge packet RAP to the leaf apparatus 31, 32, or 33 that sends the register request packet RRP.

Step S23: If hub 2 receives a station sync packet SSP sent by the leaf apparatus 31, 32, or 33 of step S22 while it is in state 11, it is changed to state 12.

Here, the station sync packet SSP is sent by the leaf apparatus 31, 32, or 33 that received the register acknowledge packet RAP using the time division multiplexing time slot allocated to the leaf apparatus 31, 32, or 33.

In state 12, hub 2 completes the connection registration for the leaf apparatus 31, 32, or 33, and the leaf apparatuses 31, 32, or 33 can send and receive data signals using data area 11 in each frame.

Step S24: In state 11, if hub 2 does not receive a station sync packet SSP from the leaf apparatus 31, 32, or 33 in step S22 for a predetermined period of time, it is returned to state 10.

Step S25: If hub 2 receives a register request packet RRP for the same time division multiplexing time slot from another one of leaf apparatuses 31, 32, and 33 during the registration procedure of the one leaf apparatus 31, 32, or 33, hub 2 sends a register rejection packet RNP to the one leaf apparatus 31, 32, or 33.

Here, hub 2 judges whether the register request packet RRP is sent by another one of leaf apparatuses 31, 32, and 33 based on the unique ID included in the register request packet RRP.

Step S26: If hub 2 receives a register request packet RRP from a registered one of leaf apparatuses 31, 32, and 33 due to a radio link failure or the like while in state 12, hub 2 is brought into state 11 and sends a register acknowledge packet RAP to the corresponding leaf apparatus 31, 32, or 33.

Step S27: If hub 2 receives a register request packet RRP from another one of leaf apparatuses 31, 32, and 33 while in state 12, hub 2 sends a register rejection packet RNP to the corresponding leaf apparatus 31, 32, or 33 that sends the register request packet RRP.

Step S28: If hub 2 does not receive a station sync packet SSP0, SSP1, SSP2, or SSP3 from a registered one of leaf apparatuses 31, 32, and 33 for a predetermined period of time while in state 12, hub 2 judges that this one of leaf apparatuses 31, 32, and 33 is lost, and is changed to state 13.

Step S29: If hub 2 receives a register request packet RRP from the same registered one of leaf apparatuses 31, 32, and 33 while in state 13, it is changed to state 11, and sends a register acknowledge packet RAP to the leaf apparatus 31, 32, or 33.

Step S30: If hub 2 does not receive a register request packet RRP from the same registered one of leaf apparatuses 31, 32, and 33 while in state 13, it is changed to state 10, and the corresponding time division multiplexing time slot becomes a target for being again allocated.

Step S31: If hub 2 receives a register request packet RRP from another one of leaf apparatuses 31, 32, and 33 while in state 13, it sends a register rejection packet RNP to the current registered leaf apparatus 31, 32, or 33.

Next, an example of the internal structure of hub 2 and leaf apparatuses 31, 32, and 33 constituting radio communication system 1 will be described with reference to FIG. 6. According to an embodiment of the invention, hub 2 and leaf apparatuses 31, 32, and 33 may have the same basic structure shown in FIG. 6.

Figure 6:
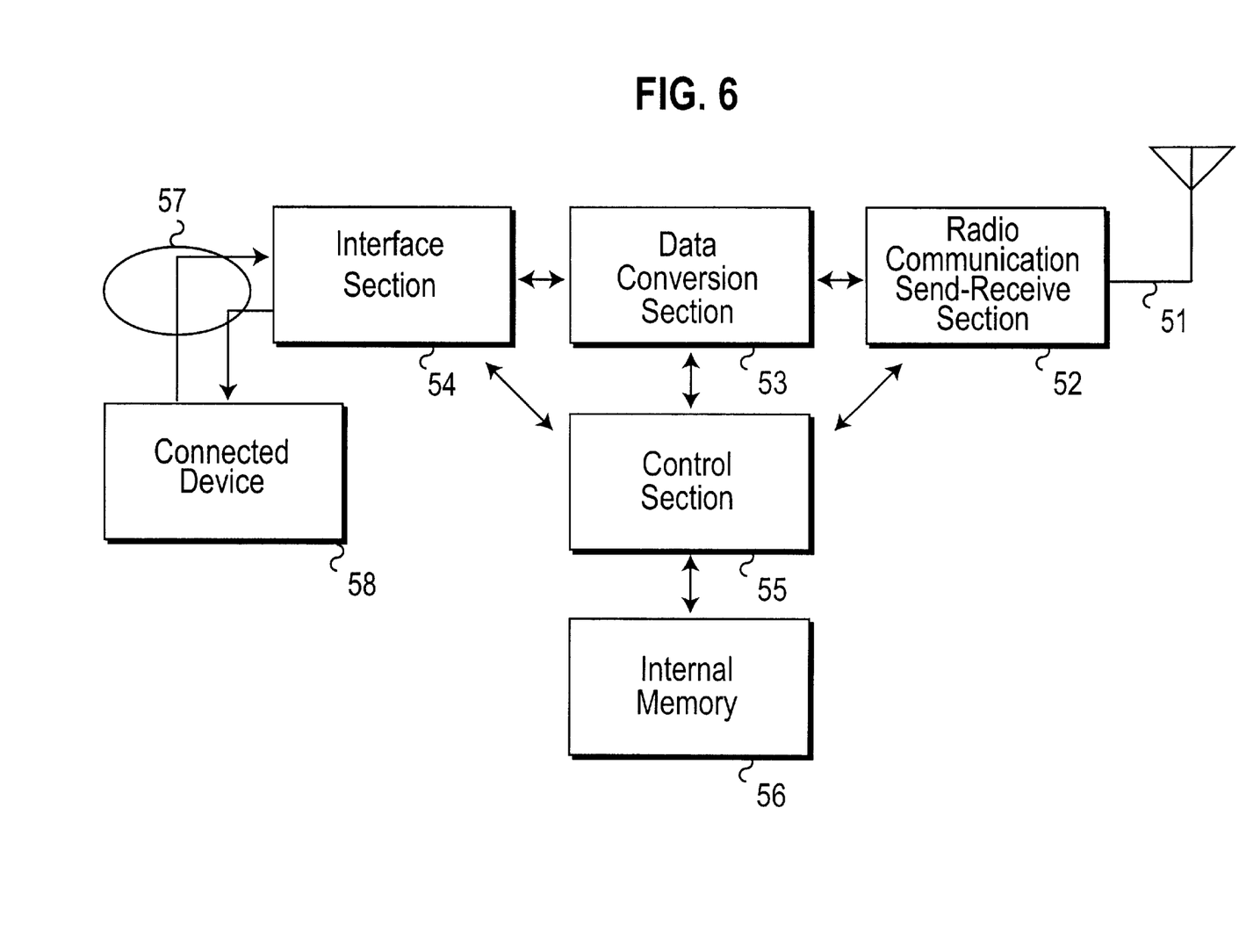
FIG. 6 shows a structure of a radio communication apparatus in accordance with an embodiment the present invention.

As shown in FIG. 6, a radio communication apparatus 2, 31, 32, or 33 includes an antenna 51 for sending and receiving RF signals (including the control signals and data signals described above), a radio communication send-receive section 52 connected to antenna 51 for carrying out radio sending processing and radio receiving processing.

As an example of a transmission mode of radio communication send-receive section 52 for sending and receiving signals, a transmission mode using a multicarrier signal, such as the Orthogonal Frequency Division Multiplex ("OFDM") mode, may be used. An extremely high frequency band (e.g., 5 GHz band) may be used for sending and receiving signals.

A sending output may be set relatively low in power. For example, if radio communication system 1 is used indoors, the output may be set to such a low level because radio contact can be made in a relatively short distance of several meters or several tens of meters.

Radio communication send-receive section 52 may send and receive the station sync packets (SSP0, SSP1, SSP2, and SSP3), register request packet RRP, and the like, in control area 10 shown in FIG. 2. Further, in data area 11 shown in FIG. 2, radio communication send-receive section 52 may send and receive an asynchronous data signal and an isochronous data signal based on a transmission control from hub 2.

As shown in FIG. 6, a radio communication apparatus 2, 31, 32, or 33 may include a data conversion section 53 for converting data on signals received and sent by radio communication send-receive section 52. Data converted in data conversion section 53 may be supplied to a device 58 connected through an interface 54, data supplied from the connected device 58 may be supplied to data conversion section 53 through interface 54, thereby converting the data.

An external interface 57 of interface 54 may be an IEEE 1394 formatted high performance serial bus. Voice or image information or various data information can be sent to and received from connected device 58 through high-speed serial bus 57. Alternatively, these radio communication transmission devices may be incorporated in a body of connected device 58.

Also, each portion of the radio communication apparatus shown in FIG. 6 carries out processing based on the control of a control section 55 constituted by a microcomputer, or the like.

If a signal received by radio communication send-receive section 52 is a control signal, the received signal may be supplied to control section 55 through data conversion section 53, and control section 55 may set various devices to states indicated by the received control signal.

Further, an internal memory 56 is connected to control section 55. Stored in internal memory 56 may include data required for controlling the communication, the number of communication stations constituting the network, information concerning a method of utilizing a transmission path, information concerning allocation of station sync packet SSP, and the like.

If a signal received by control section 55 is a synchronous signal, control section 55 may judge the timing of receiving the synchronous signal, set a frame period based on the synchronous signal, and execute the communication control procedure based on the frame period.

As explained above, according to an embodiment of the invention, leaf apparatuses 31, 32, and 33 whose connections are not registered may specify vacant time division multiplexing time slots based on the vacant slot information included in a cycle start packet CSP received from hub 2, and each may send a register request packet RRP to hub 2 using its specified vacant time division multiplexing time slot. Therefore, leaf apparatuses 31, 32, and 33 may automatically register connections without receiving polling from hub 2. That is, leaf apparatuses 31, 32, and 33 may be plug-and-play apparatuses.

According to an embodiment of the invention, hub 2 may hold a connection register of leaf apparatuses 31, 32, and 33 for a predetermined time even if hub 2 does not receive station sync packets SSP1, SSP2 and SSP3 from leaf apparatuses 31, 32, and 33.

Therefore, even if hub 2 does not receive station sync packets SSP1, SSP2, and SSP3 from leaf apparatuses 31, 32, and 33 due to unstable (low communication quality) of the radio communication environment, if the duration of such is within a predetermined period of time, hub 2 may hold the connection register of leaf apparatuses 31, 32, and 33. As a result, it is possible to effectively prevent the connections of leaf apparatuses 31, 32, and 33 from being frequently cut, and to prevent connection registration from being repeated.

Thus, as described above, it is possible to automatically register a connection of a controlled radio communication apparatus, and to realize a stable radio communication.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therein.

What is claimed is:

1. A first radio communication apparatus for controlling radio communications of one or more second radio communication apparatuses in a radio communication system, said first radio communication apparatus comprising:

a radio sending/receiving section for sending vacant slot information indicative of one or more vacant time division multiplexing time slots to said one or more second radio communication apparatuses, and for receiving a connection register request signal from each of said one or more second radio communication apparatuses on the one or more vacant time division multiplexing time slots based on the vacant slot information; and a control section for allocating the one or more vacant time division multiplexing time slots to the one or more second radio communication apparatuses based on respective connection register request signals received therefrom; and wherein said control section rejects a connection of one of the one or more second radio communication apparatuses and sends a register nonacknowledge signal to said second radio communication apparatus when the connection register request signal corresponding to said second radio communication apparatus and the connection register request signal corresponding to another of the one or more second radio communication apparatuses is received on one of the one or more vacant time division multiplexing time slots.

2. The first radio communication apparatus according to claim 1, wherein said radio communications is carried out with a frame as a unit, said frame including a first period for sending the vacant slot information and a second period allocated to a plurality of time division multiplexing time slots.

3. The first radio communication apparatus according to claim 2, wherein said frame further includes a third period for sending and receiving data signals.

4. The first radio communication apparatus according to claim 1, wherein said control section registers a connection of one of the one or more second radio communication apparatuses and sends a register acknowledge signal to said second radio communication apparatus when only the connection register request signal corresponding to said second radio communication apparatus is received on one of the one or more vacant time division multiplexing time slots.

5. The first radio communication apparatus according to claim 1, wherein
   said control section receives a control signal on a respective allocated time division multiplexing time slot from a respective second radio communication apparatus for maintaining a registered connection thereof,
   said control section disconnects the registered connection of the respective second radio communication apparatus if said control section does not receive the control signal within a predetermined period of time, and
   said control section holds the registered connection of the respective second radio communication apparatus even if the control section does not receive the control signal from the respective second radio communication apparatus if the predetermined period of time has not elapsed.

6. A radio communication method of using a first radio communication apparatus to control radio communications of one or more second radio communication apparatuses, comprising the steps of:
   sending vacant slot information indicative of one or more vacant time division multiplexing time slots to said one or more second radio communication apparatuses;
   receiving a connection register request signal from each of said one or more second radio communication apparatuses on the one or more vacant time division multiplexing time slots based on the vacant slot information;
   allocating the one or more vacant time division multiplexing time slots to the one or more second radio communication apparatuses based on respective connection register request signals received therefrom; and
   rejecting a connection of one of the one or more second radio communication apparatuses and sending a register nonacknowledge signal to said second radio communication apparatus when the connection register request signal corresponding to said second radio communication apparatus and the connection register request signal corresponding to another of the one or more second radio communication apparatuses is received on one of the one or more vacant time division multiplexing time slots.

7. The radio communication method according to claim 6, wherein said radio communications is carried out with a frame as a unit, said frame including a first period for sending the vacant slot information and a second period allocated to a plurality of time division multiplexing time slots.

8. The radio communication method according to claim 7, wherein said frame further includes a third period for sending and receiving data signals.

9. The radio communication method according to claim 6, further comprising the step of registering a connection of one of the one or more second radio communication apparatuses and sending a register acknowledge signal to said second radio communication apparatus when only the connection register request signal corresponding to said second radio communication apparatus is received on one of the one or more vacant time division multiplexing time slots.

10. The radio communication method according to claim 6, further comprising the steps of:
   periodically receiving a control signal on a respective allocated time division multiplexing time slot from a respective second radio communication apparatus for maintaining a registered connection thereof;
   disconnecting the registered connection of the respective second radio communication apparatus if the control signal is not received within a predetermined period of time; and
   holding the registered connection of the respective second radio communication apparatus even if the control signal is not received from the respective second radio communication apparatus if the predetermined period of time has not elapsed.

11. A radio communication method of controlling radio communications of one or more second radio communication apparatuses by using a first radio communication apparatus, comprising the steps of:
   sending vacant slot information indicative of one or more vacant time division multiplexing time slots from said first radio communication apparatus to said second radio communication apparatus;
   sending a connection register request signal from said second radio communication apparatus to said first radio communication apparatus using one of the one or more vacant time division multiplexing time slots based on said vacant slot information;
   allocating the one vacant time division multiplexing time slot to said second radio communication apparatus that sent said connection register request signal based on said connection register request signal received by said first radio communication apparatus, wherein said second radio communication apparatus sends a control signal using the allocated time division multiplexing time slot allocated by said first radio communication apparatus; and
   rejecting a connection of one of the one or more second radio communication apparatuses at said first radio communication apparatus and sending a register nonacknowledge signal from said first radio communication apparatus to said second radio communication apparatus when the connection register request signal corresponding to said second radio communication apparatus and the connection register request signal corresponding to another of the one or more second radio communication apparatuses is received on one of the one or more vacant time division multiplexing time slots.

12. The radio communication method according to claim 11, wherein said radio communication is carried out with a frame as a unit, said frame comprising a first period for sending the vacant slot information and a second period allocated to a plurality of time division multiplexing time slots.

13. The radio communication method according to claim 12, wherein said frame further includes a third period for sending and receiving data signals.

14. The radio communication method according to claim 13, wherein said one or more second radio communication apparatuses send and receive data signals using said third period in an asynchronous mode.

15. The radio communication method according to claim 13, wherein said one or more second radio communication apparatuses send and receive data signals using a fourth period within said third period based on control by said first radio communication apparatus, and send and receive data signals in an asynchronous mode using a fifth period within said third period.

16. The radio communication method according to claim 11, further comprising the step of registering a connection of one of the one or more second radio communication apparatuses at said first radio communication apparatus and sending a register acknowledge signal from said first radio communication apparatus to said second radio communication apparatus when only the connection register request signal corresponding to said second radio communication apparatus is received on one of the one or more vacant time division multiplexing time slots.

17. The radio communication method according to claim 11, further comprising the steps of:

receiving, at said first radio communication apparatus, a control signal on a respective allocated time division multiplexing time slot from a respective second radio communication apparatus for maintaining a registered connection thereof, disconnecting, at said first radio communication apparatus, the registered connection of the respective second radio communication apparatus if said first radio communication apparatus does not receive the control signal within a predetermined period of time, and holding, at said first radio communication apparatus, the registered connection of the respective second radio communication apparatus even if the first radio communication apparatus does not receive the control signal from the respective second radio communication apparatus if the predetermined period of time has not elapsed.

18. A radio communication system, comprising:

a first radio communication apparatus, and one or more second radio communication apparatuses for carrying out radio communications, wherein said first radio communication apparatus includes:

a first radio sending/receiving section for sending vacant slot information indicative of one or more vacant time division multiplexing time slots to said one or more second radio communication apparatuses, and for receiving a connection register request signal from each of said one or more second radio communication apparatuses using the one or more vacant time division multiplexing time slots; and a first control section for allocating one of the one or more vacant time division multiplexing time slots to one of said one or more second radio communication apparatuses based on a received connection register request signal, thereby registering a connection, and said one or more second radio communication apparatuses each include:

a second radio sending/receiving section for receiving the vacant slot information indicative of the one or more vacant time division multiplexing time slots from said first radio communication apparatus, and sending said respective connection register request signal using one of the one or more vacant time division multiplexing time slots; and a second control section for generating the respective connection register request signal based on said vacant slot information; and wherein said first radio communication apparatus rejects a connection of one of the one or more second radio communication apparatuses and sends a register non-acknowledge signal to said second radio communication apparatus when the connection register request signal corresponding to said second radio communication apparatus and the connection register request signal corresponding to another of the one or more second radio communication apparatuses is received on one of the one or more vacant time division multiplexing time slots.

19. The radio communication system according to claim 18, wherein said radio communications is carried out with a frame as a unit, said frame comprising a first period for sending the vacant slot information and a second period allocated to a plurality of time division multiplexing time slots.

20. The radio communication system according to claim 19, wherein said frame further includes a third period for sending and receiving data signals.

21. The radio communication system according to claim 20, wherein said one or more second radio communication apparatuses send and receive data signals using said third period in an asynchronous mode.

22. The radio communication system according to claim 20, wherein said one or more second radio communication apparatuses send and receive data signals using a fourth period within said third period based on control by said first radio communication apparatus, and send and receive data signals in an asynchronous mode using a fifth period within said third period.

23. The radio communication system according to claim 18, wherein said first radio communication apparatus registers a connection of one of the one or more second radio communication apparatuses and sends a register acknowledge signal to said second radio communication apparatus when only the connection register request signal corresponding to said second radio communication apparatus is received on one of the one or more vacant time division multiplexing time slots.

24. The radio communication system according to claim 18, wherein said first radio communication apparatus receives a control signal on a respective allocated time division multiplexing time slot from a respective second radio communication apparatus for maintaining a registered connection thereof, said first radio communication apparatus disconnects the registered connection of the respective second radio communication apparatus if said control section does not receive the control signal within a predetermined period of time, and said first radio communication apparatus holds the registered connection of the respective second radio communication apparatus even if the control section does not receive the control signal from the respective second radio communication apparatus if the predetermined period of time has not elapsed.

* * * * *